United States Patent [19]

Flinchbaugh

[11] 3,833,092

[45] Sept. 3, 1974

[54] TRANSPORT MECHANISM FOR STAIRWAY ELEVATOR

[75] Inventor: Henry K. Flinchbaugh, York, Pa.

[73] Assignee: Flinchbaugh/Murray Corporation, York, Pa.

[22] Filed: Apr. 4, 1973

[21] Appl. No.: 347,846

[52] U.S. Cl. ............................ 187/12, 74/424.8 R
[51] Int. Cl. ............................................. B66b 9/06
[58] Field of Search ................... 187/12, 24, 25; 74/424.8 R

[56] References Cited
UNITED STATES PATENTS

| | | | |
|---|---|---|---|
| 2,527,897 | 10/1950 | Todd | 187/25 |
| 2,663,929 | 12/1953 | Carpenter | 187/24 |
| 2,824,623 | 2/1958 | Nord et al. | 187/12 |
| 3,416,386 | 12/1968 | Pickles | 74/424.8 R |
| 3,468,401 | 9/1969 | Letz | 187/25 |
| 3,687,234 | 8/1972 | Gendreau | 187/25 |

*Primary Examiner*—Robert B. Reeves
*Assistant Examiner*—Hadd Lane
*Attorney, Agent, or Firm*—Paul & Paul

[57] ABSTRACT

A drive nut is mounted at one end of a load distributing carriage through which passes a threaded shaft which is fixed against rotation and engaged with said nut. The nut is rotationally driven about the shaft to cause the carriage to move up or down the shaft. An additional nut is carried by the shaft and connected to the drive nut for movement therewith. The additional nut is unloaded and provides a safety stop in the event of failure of the drive nut.

9 Claims, 7 Drawing Figures

TRANSPORT MECHANISM FOR STAIRWAY ELEVATOR

BACKGROUND OF THE INVENTION

This invention relates to stairway elevators, and more particularly, to the drive mechanism for moving an elevator up and down a stairway.

Early prior art drive mechanisms, such as those shown in U.S. Pat. No. 2,207,544 and 2,270,735, attempted to drive a threaded shaft directly off the shaft of a motor to cause a nut, engaged with the shaft and restrained against rotation, to move up and down the shaft and thereby move the stairway elevator. As the art developed, the motors, clutch, and brake mechanisms were carried with the elevator, as shown in my prior U.S. Pat. No. 3,662,859 and in U.S. Pat. No. 2,824,623. In the latter patent, the shaft is stationary and the nut is driven. This patent also discloses the use of a ball nut to reduce friction. Tests have shown that such nuts are impractical due to the fact that the noise factor is too great when operating at required speeds, thereby making the unit unsaleable. Further, the nut shown in the U.S. Pat. No. 2,824,623 patent does not incorporate a safety means in case of failure. This is absolutely necessary considering the cargo of the elevator.

It would also be desirable in view of the prior art, to eliminate the braking mechanism; so long as the braking feature could be incorporated in other parts of the device so that that function was still present in the finished mechanism.

SUMMARY OF THE INVENTION

By the present invention I have eliminated the objectional noise factor and the entire braking mechanism known in the prior art and I have provided a fail-safe feature in the event of breakdown of the drive nut.

In accordance with the preferred embodiment of my invention, the drive nut has an Acme thread and is fixedly connected to a tubular carriage member which is mounted for rotation to the base of the elevator chair housing and supports the housing about the fixed shaft which passes through the nut. Another nut is spaced below the drive nut on the shaft and a pin engages it with the drive nut for rotation therewith. This second nut is not loaded, but merely rotates about the threads as the elevator moves up and down the shaft. By using an Acme thread and a nylon nut, the frictional forces are such that a braking mechanism is not necessary once the motor has been turned off. That is, the device will stop within approximately an inch of travel once motive power has been disconnected.

Accordingly, it is an object of this invention to greatly improve the existing designs of transport mechanisms in stairway elevators. This and other objects of my invention will become apparent from the following description with reference to the accompanying drawings.

BRIEF DESCRIPTION OF THE DRAWINGS

FIG. 3 is a foreshortened section partially broken away, taken as indicated by the lines and arrows 3—3 in FIG. 2.

DESCRIPTION OF THE PREFERRED EMBODIMENT

Figure 1:
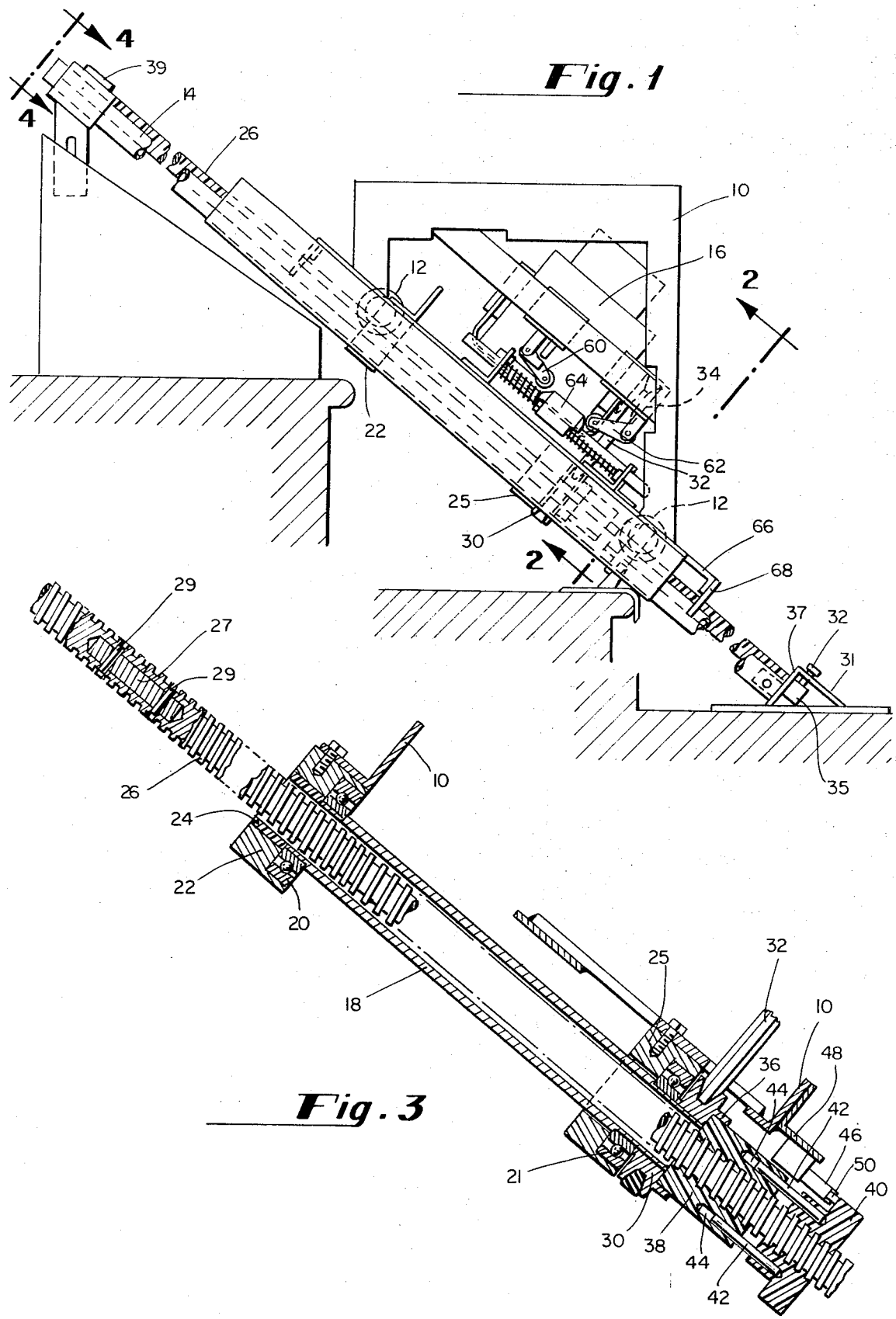
FIG. 1 is a foreshortened side view of a portion of a stairway elevator shown mounted in position on the stairs.

Although specific forms of the invention have been selected for illustration in the drawings, and the following description is drawn in specific terms for the purpose of describing these forms of the invention, this description is not intended to limit the scope of the invention which is defined in the appended claims.

Figure 2:
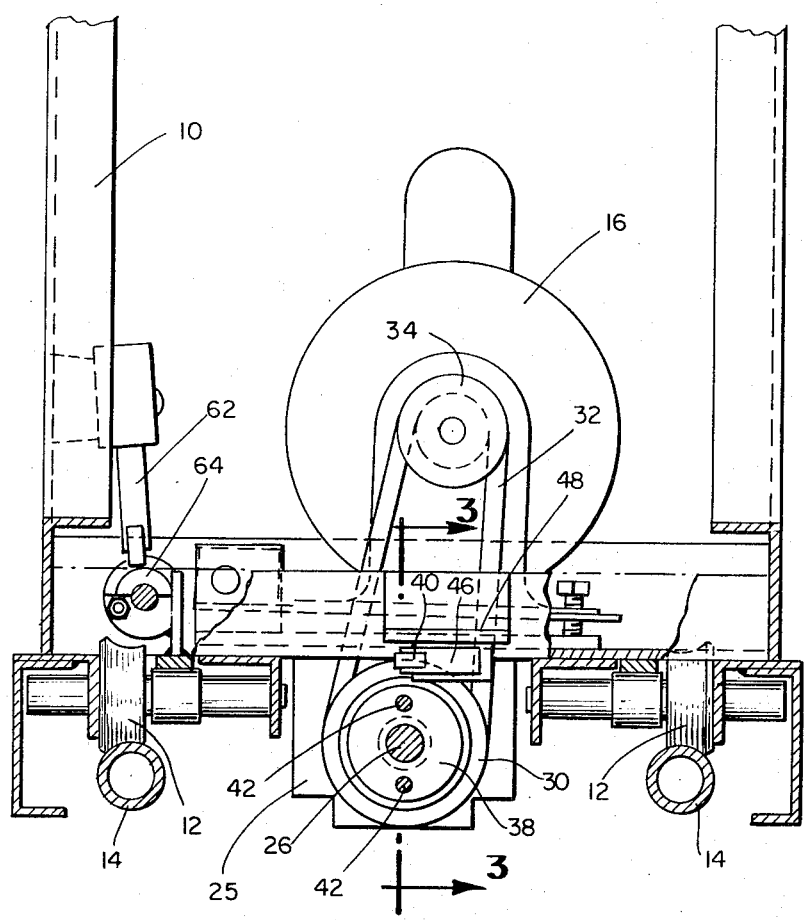
FIG. 2 is an enlarged section partially broken away, taken as indicated by the lines and arrows 2—2 in FIG. 1.
Figure 4:
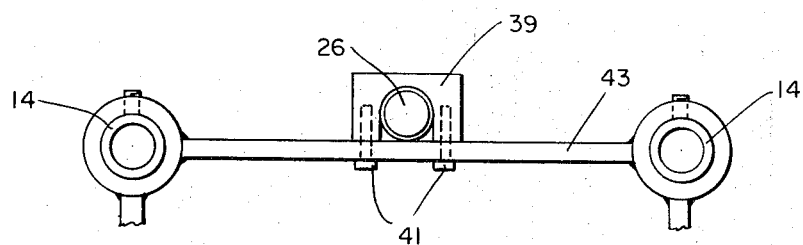
FIG. 4 is a top end view of the apparatus shown in FIG. 1, taken as indicated by the lines and arrows 4—4.

As in the prior art, the elevator housing 10, FIG. 2, is mounted in any suitable way on a plurality of wheels 12, which ride on rails 14. The housing carries the motor 16. In order to drive this housing up and down the stairs on the rails, a transport mechanism is necessary. In accordance with my invention, this transport mechanism comprises a supporting bearing means comprising a tubular member 18, FIG. 3, supported by two sealed radial thrust ball bearings 20 and 21. The bearings are located at each end of the tubular member 18 for linear stability and support of the side thrust created by the driving belt and torque load. It is desirable to have this tubular member extend to a length which is limited solely by the confines of the elevator itself, so as to provide maximum distribution of load. The upper end of the tubular member has its ball bearing 20 mounted in an aluminum bracket 22 which is provided with a nylon bearing bushing 24 disposed about and proximate to the shaft 26; the clearance therebetween being on the order of a few thousandths of an inch. The lower end of the tubular member 18 has its bearing 21 supported in aluminum bracket 25. Both aluminum brackets are mounted to the housing in any suitable way, as indicated by the bolts in FIG. 3.

A driven pulley 30 is keyed and press fitted onto the end of the tubular member 18 which extends beyond the lower ball bearing 21. The pulley has a v-groove in its outer periphery for engagement with the belt 32 so that it can be driven by the drive pulley 34 on the motor 16, FIG. 2. An outwardly extending annular flange 36 on the pulley 30 provides a socket in which is mounted the main driving threaded nut 38. The nut 38 is supported by bolts (not shown) threaded through the face of the pulley 30. This driving nut is made of nylon. It is threaded with a one inch diameter Acme thread, five threads per inch, and engages the shaft 26.

What has been described thus far is the transport mechanism by which the elevator is moved up and down the shaft upon appropriate motive input from the motor 16 through the belt 32. In order to insure that the mechanism will come to a safe halt in the event of a brakedown of the threads of the drive nut, I have provided an auxiliary or floating safety nut 40. This nut has the same threads as the drive nut, but carries no load. It is spaced approximately one full thread below the drive nut and is connected to the drive nut by the pins 42 which are disposed in a sliding fit in holes in the drive nut. These holes 44 are of sufficient length to provide for the actuation of a microswitch 46 mounted to the frame member 48 in the event of a failure of the threads of the drive nut 38. In such event, the elevator would slip down the shaft 26 and the microswitch actuator 50 which engages the outwardly extending flange of the auxiliary nut 40 would, through appropriate circuitry (not shown, but well known in the electrical art), stop the electric motor 16 and the apparatus would come to rest against the auxiliary nut 40, thereby preventing uncontrolled descent of the elevator with respect to the shaft.

The shaft 26 is composed of a plurality of sections which are connected by means of a centrally disposed pin 27 and cross pins 29, all mounted in pre-bored holes aligned so as to provide a continuous thread. The ends of the shaft are fixed to the structure mounted to the stairs so that the shaft does not turn. At the lower end, a bracket 31 is provided with a bolt 33 passing therethrough engaging the reduced end of the shaft 35 which extends through the face of the bracket, so that the shoulder formed by the reduction rests against the face 37. The upper end of the shaft is mounted by a yoke 39 and bolts 41 to the cross member 43 extending between the mounting brackets for the rails (which are well known in the art).

The present invention eliminates the need for a separate braking mechanism because the nylon bearing and Acme thread provide sufficient frictional resistance so that travel after the motor has been turned off will be approximately one inch given the dimensions previously set forth in this specification. In the prior art, a similarly designed ball nut would travel three to four inches, and this would necessitate a brake. In order that the elevator come to a gentle stop at the limit of its travel up or down, a limit switch mechanism has been provided. See for example, the limit switch shown in my prior art U.S. Pat. No. 3,662,859 which actuated a braking mechanism. Here, the braking mechanism has been eliminated by the design, and so the limit switch merely cuts off the power when appropriately actuated, allowing the device to coast to a stop. In accordance with the way in which the limit switch has been positioned in the present invention, there will be a momentary coast of approximately five eighths of an inch from the time the toggle switch which actuates the motor is released and the time the actuating arms for the limit switch have cut off the motor. In addition, there will be approximately one half of an inch of travel thereafter. The electrical circuitry forms no part of this invention and therefore, the toggle switch and electrical wiring to the motor and limit switch will not be shown herein. However, they are well within the scope of anyone skilled in the electrical art, or more particularly, in the art of stairway elevators. The limit switch is shown in FIG. 1 and, like my prior art device, comprises an upper limit actuating arm 60 and lower limit actuating arm 62 which are positioned to engage a cam 64. The cam is spring loaded to return to its neutral position as shown in the figure and the prior art. The limit switch is actuated by movement of an undercarriage 66 which has a bumper 68 which moves the member 66 which moves relative to the housing in the event that it contacts any foreign object that may be lying on the stairs in the path of the car, such as the mounting brackets at the ends of the rails.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:

1. In a stairway elevator having a housing mounted on rails for movement up and down the stairway and a source of controlled electromotive power mounted in said housing for movement therewith, an improved transport mechanism comprising:
   a. a threaded shaft mounted on said stairway and fixed against rotation;
   b. a drive nylon nut having an Acme thread in threaded engagement with said shaft for movement therealong, said nut being driven by drive means engaged with said nut and said motor; and
   c. bearing means supporting said drive means and distributing the torque load along said shaft.

2. The invention of claim 1 wherein said bearing means comprises a tubular member disposed about said shaft having a plurality of bearings engaging said housing and said tubular member to provide for relative rotation therebetween.

3. The invention of claim 2 wherein said tubular member has a bearing bushing at the end thereof remote from said drive means and disposed proximate to said shaft.

4. The invention of claim 1 wherein a safety means is provided mounted on said shaft and movable with said nut to prevent uncontrolled descent of said elevator with respect to said shaft in the event of failure of said nut.

5. The invention of claim 4 wherein said safety means comprises an auxiliary nut in threaded engagement with said shaft and connected to said drive nut for movement therewith.

6. The invention of claim 5 wherein said safety means also includes an electrical actuating means to cut off the electric motive supply to said motor in the event of failure of said drive nut.

7. The invention of claim 6 wherein said drive nut is pin connected to said auxiliary nut to provide a means for both rotating said auxiliary nut and allowing said drive nut to slide toward said auxiliary nut and rest against it in the event of failure of the threads of said drive nut.

8. In a stairway elevator having a housing mounted on rails for movement up and down the stairway and a source of controlled electromotive power mounted in said housing for movement therewith, an improved transport mechanism comprising:
   a. a threaded shaft mounted on said stairway and fixed against rotation;
   b. a drive nylon nut having an Acme thread in threaded engagement with said shaft for movement therealong, said nut being driven by drive means engaged with said nut and said motor;
   c. bearing means supporting said drive means and distributing the torque along said shaft;
   d. safety means mounted on said shaft and movable with said nut for prevention of uncontrolled descent of said elevator with respect to said shaft in the event of failure of said nut, said safety means comprising an auxiliary nut in threaded engagement with said shaft and connected to said drive nut for movement therewith and including electrical actuating means to cut off the electromotive supply to said motor in the event of failure of said drive nut wherein said electrical actuating means comprises an electrical switch mounted to said housing and engaging said auxiliary nut and so positioned with respect thereto that relative movement along said shaft of said drive nut toward said auxiliary nut will cause said switch to be actuated and cut off the electromotive supply to said motor.

9. The invention of claim 1 wherein limit means are provided attached to said housing and actuated by a bumper to cut off the electromotive power to said motor upon engagement with any object sufficient to cause relative movement between the bumper and the housing, thereby allowing the elevator to come to a stop.

* * * * *